United States Patent [19]

Edstrom

[11] Patent Number: 4,733,493
[45] Date of Patent: Mar. 29, 1988

[54] TRAP GUN

[75] Inventor: Paul A. Edstrom, Pocatello, Id.

[73] Assignee: The United States of America as represented by the Secretary of Agriculture, Washington, D.C.

[21] Appl. No.: 42,033

[22] Filed: Apr. 24, 1987

[51] Int. Cl.$^4$ ........................................... A01M 27/00
[52] U.S. Cl. ......................................................... 43/84
[58] Field of Search ............................................... 43/84

[56] References Cited

U.S. PATENT DOCUMENTS

| | | | |
|---|---|---|---|
| 760,274 | 5/1904 | Thomas | 43/84 |
| 796,439 | 8/1905 | Lovelace | 43/84 |
| 1,348,543 | 9/1920 | Crockett | 43/84 |
| 1,424,614 | 8/1922 | Brown | 43/84 |
| 2,001,405 | 5/1935 | Abbott | 43/84 |
| 2,145,488 | 1/1939 | Marlman | 43/84 |
| 2,456,957 | 12/1948 | Koch et al. | 43/84 |
| 3,391,483 | 7/1968 | Marlman | 43/84 |

Primary Examiner—Nicholas P. Godici
Assistant Examiner—Karen Skillman
Attorney, Agent, or Firm—M. Howard Silverstein

[57] ABSTRACT

In a trap gun having a hollow stake and a barrel nested therein, wherein the barrel includes a trigger and a poisonous material-filled cartridge, the improvement wherein the trigger trip is a one-piece spring wire form having a helical segment which wraps around the stake, and two segments extending from opposite ends of the helix. One of the two segments extends inwardly of the helix and protrudes through a hole in the stake wall to anchor the form, while the other segment extends in the direction of the trigger to engage it when the barrel moves outwardly of the stake.

3 Claims, 5 Drawing Figures

U.S. Patent Mar. 29, 1988 4,733,493
FIG.1 PRIOR ART
FIG.2 PRIOR ART
FIG.3 PRIOR ART
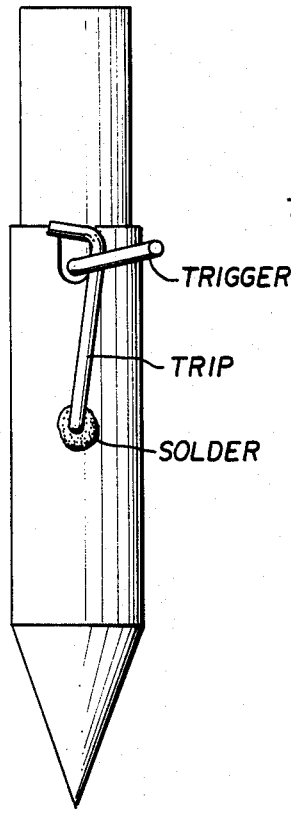
TRIGGER
TRIP
SOLDER
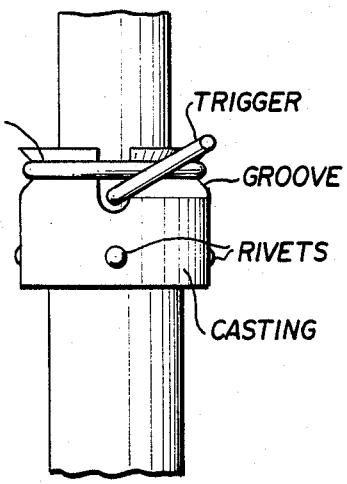
TRIP
TRIGGER
GROOVE
RIVETS
CASTING
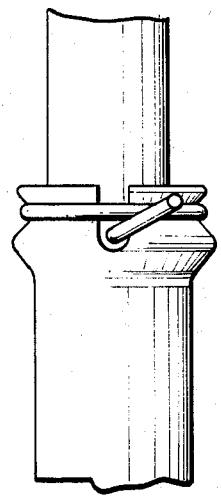
FIG.4
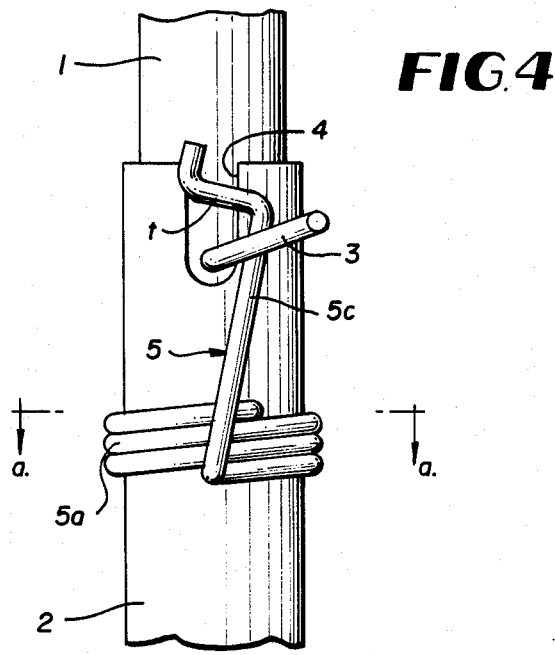
FIG.4a
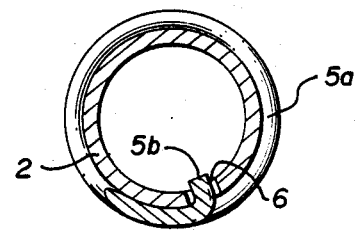

TRAP GUN

FIELD

This invention relates to killing predatory animals such as coyotes.

PRIOR ART

Predatory control programs have used trap guns for many years to control predatory animals. Pat. Nos. 2,145,488 and 3,340,645 illustrate such devices. Briefly these trap guns comprise a hollow stake which is vertically placed in the ground, and a cylindrical barrel nested within the hollow stake through an opening at the top thereof. The barrel includes a firing mechanism having a trigger which transversely extends outwardly of the stake through a slot in the stake wall, and a poisonous material-filled cartridge. A trip is attached to the side of the stake wall adjacent the trigger. In practice, bait is secured to the upper end of the barrel. When an animal tugs on the bait, the barrel moves upwardly in the stake causing the trigger to engage the trip and be tripped thereby, resulting in the cartridge's discharge in the animal's mouth.

There has been a continuous problem with prior art devices with regard to attaching a trigger trip to the stake. The earliest successful device, FIG. 1, used a trip in the form of a longitudinally-mounted spring wire fastened by soft solder to the stake, and having a transverse arm on the spring wire to engage the trigger. The soft solder often broke, allowing the trip to fall off. The use of harder solder has not been successful because of the need for greater heat to anchor the wire, which removes the temper from the spring wire. In addition, attachment by soldering or welding is too slow for production purposes and makes replacement in the field difficult for personnel lacking the proper equipment and skill.

To overcome these drawbacks, later devices, FIG. 2, utilized a spring clip as a trip transversely mounted on a cylindrical casting riveted to the top of the stake. The casting included a ring shaped groove adjacent the trigger slot to accept the spring clip. The drawbacks to this device are that the cylindrical castings can break; rivets come loose and fall out; rivets interfere with the free movement of the barrel in the hollow stake; and the cost of parts and installation is equal to or greater than soldering.

The most recent stake, FIG. 3, has grooves or ridges machined directly onto the stake itself adjacent the slot to form a ring shaped groove to hold a transversely mounted spring clip as a trip. This means of attachment is simpler than either of the previous means, and presently is the preferred style. The major drawbacks are in the manufacturing process. Expensive machinery and forming dies are required. The forming must be done in two stages requiring a considerable amount of time and labor, whereby costs are increased.

SUMMARY

I have now devised a new and improved trip, which is a one-piece spring wire form having a helically-shaped segment which wraps around the stake, and first and second segments extending from opposite ends of the helix. The first segment extends inwardly of the helix to protrude through a hole in the wall of the stake to anchor the spring wire form in place. The second segment extends longitudinally along the stake's outer surface in the direction of the trigger in the manner of the prior art device of FIG. 1, and includes a transverse arm in the manner of the prior art device of FIG. 1 to engage the trigger.

BRIEF DESCRIPTION OF THE DRAWINGS

FIG. 1 is a side view of a prior art trap gun.
FIG. 2 is a side view of a prior art trap gun.
FIG. 3 is a side view of a prior art trap gun.
FIG. 4 is a side view of the present invention trap gun.
FIG. 4a is a top view of the present invention trap gun shown in FIG. 4.

DETAILED DESCRIPTION

The device of the present invention is illustrated in a front view as shown in FIG. 4. Referring thereto, reference numeral 1 designates the barrel which nests in hollow stake or tube 2. Details of a typical barrel having a trigger and cartridge are shown in Pat. No. 3,340,645.

Reference numeral 3 designates the trigger which is transversely mounted on barrel 1, and extends through a slot 4 on stake tube 2 when the barrel is nested in the stake. A spring wire form 5 trips trigger 3 when the barrel moves outwardly, i.e., upwardly, of the stake opening. Spring wire form 5 is one-piece, and has three basic components: a helically-shaped segment 5a which wraps around the stake, and two segments, 5b and 5c, extending from opposite ends of the helix.

The tension of helical segment 5a, which preferably wraps around the stake at least 3 times, helps to maintain the wire form 5 in place. The position of the form further is maintained by segment 5b illustrated in FIG. 4a which is a view along line a-a of FIG. 4, except that the barrel 1 inside stake 2 has been omitted from FIG. 4a for purposes of simplicity. As can be seen therein segment 5b extends inwardly of the helix or coil from the end of the helix closest to the stake opening, i.e., segment 5b extends from the upper end of the helix. In its inward extension, segment 5b protrudes through a hole 6 in the wall of stake 2 to anchor spring wire form 5 into place. Hole 6 is positioned further from the stake opening than slot 4, i.e., hole 6 is positioned below slot 4.

Referring again to FIG. 4, segment 5c is a shank which extends longitudinally along the outer surface of stake 2, from the end of the helix or coil furthest from the stake opening, i.e., it extends from the lower end of the helix in the direction of the trigger (upwardly), and includes a transverse arm "t" to engage and trip the trigger.

Due to the fact that shank 5c is attached to the lower end of the helix, and due to the fact that the upper end of the helix is anchored by segment 5b in hole 6, the initial action of trigger 3 against the transverse arm "t" of shank 5c causes the shank to slightly move upwardly until the helix or coil compresses together. Thereafter, the spring wire form becomes fully fixed and trips the trigger.

In comparison to the prior art, one merely drills a small hole in the stake wall near the slot, and easily slips spring wire form 5 over the stake and anchors it in the hole. Thereby, the trigger trip is easily and cheaply constructed and attached in comparison to the prior art. Furthermore, it is able to withstand frequent trigger actuations without breaking, which is not the case with the prior art devices of FIGS. 1 and 2.

Another unique feature is that the spring wire form 5 is made in such a fashion that the longitudinal shank segment 5c extends along the outside of the helix from the lower end to and beyond the upper end thereof, while lying closely adjacent thereto. Furthermore, it covers the helix at a point where segment 5b extends inwardly, to provide additional force on the outside of the helix thereby to keep transverse segment 5b in hole 6.

I claim:

1. In a trap gun having a hollow tube and a barrel nested in the tube, wherein the barrel includes a trigger extending through a slot in the tube's wall, wherein the tube includes means to trip the trigger, the improvement wherein the trip means comprises
   (a) a hole in said tube's wall;
   (b) a one-piece spring wire form having a helical segment wrapped around said tube, and first and second segments extending from opposite ends of said helical segment; wherein said first segment extends inwardly from said helical segment and protrudes through said hole in said tube's wall; wherein said second segment longitudinally extends along said tube toward said trigger to engage said trigger when said barrel moves outwardly from said tube.

2. The gun of claim 1 wherein said tube is in a vertical position, and said barrel extends through the top thereof, wherein said hole is below said slot, wherein said first segment of said helical segment is at the upper end of said helical segment.

3. The gun of claim 2 wherein said second segment extends upwardly from the lower end of said helical segment to and beyond the upper end thereof, while lying closely adjacent thereto, wherein said second segment covers said helical segment at a point where said first segment extends inwardly.

* * * * *